INVENTORS
JERRY DONIGER
ALLAN E. SCHULZ
ATTORNEY

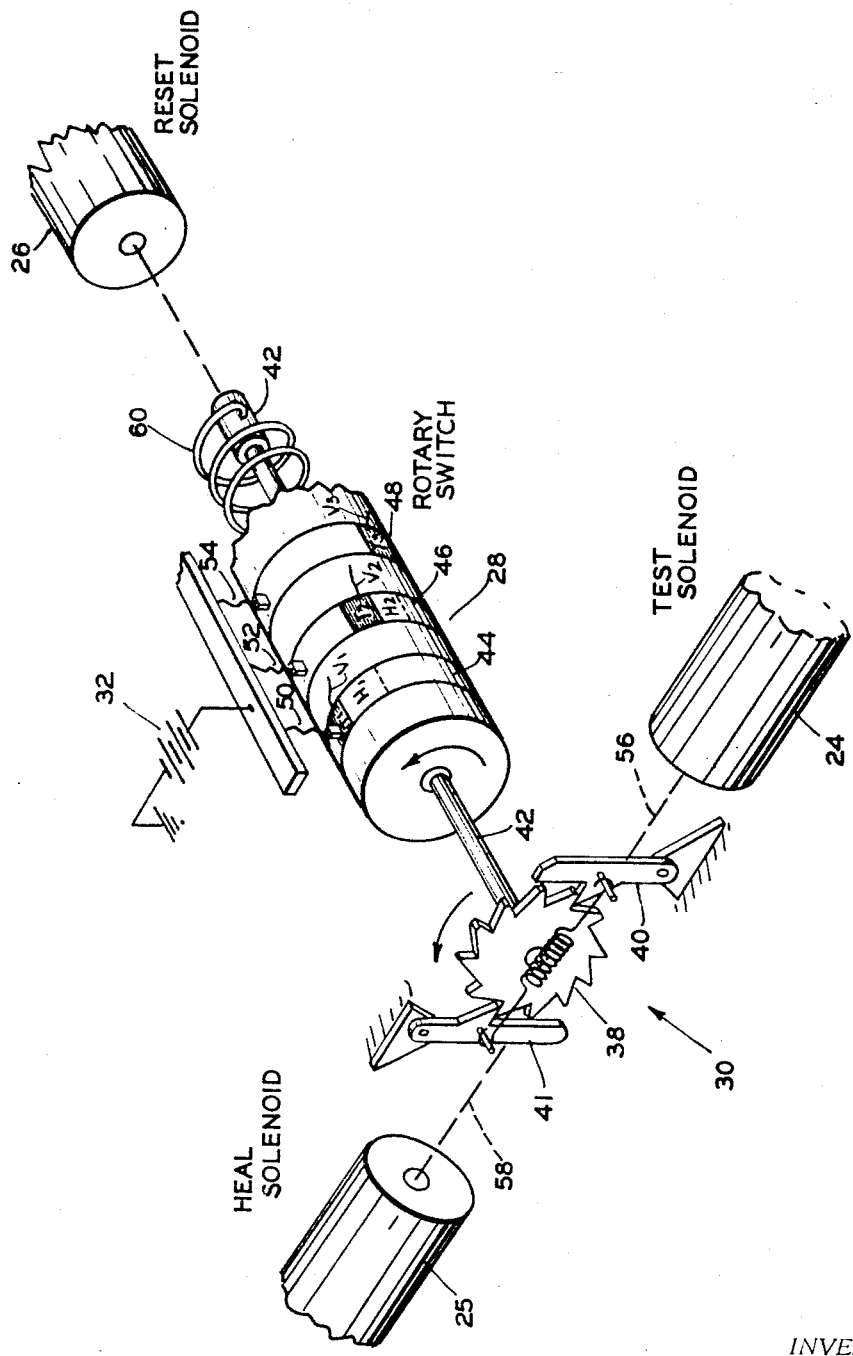

United States Patent Office 3,448,449
Patented June 3, 1969

3,448,449
AUTOMATIC TEST DEVICE
Allan E. Schulz, Glen Ridge, and Jerry Doniger, Montvale, N.J., assignors to The Bendix Corporation, a corporation of Delaware
Filed Aug. 25, 1965, Ser. No. 482,370
Int. Cl. G08b 19/00, 29/00; G08c 25/00
U.S. Cl. 340—413          8 Claims

ABSTRACT OF THE DISCLOSURE

A monitor for a control system wherein signals corresponding to conditions related to the control system and signals corresponding to a desired level of the condition signals are provided. A selected one of said signals is combined with a signal at a predetermined level so that said one signal does not correspond to the desired level, and whereupon an error signal is provided for causing the one signal and the predetermined level signal to be combined in a predetermined sequence. A system failure is indicated when the predetermined sequence is interrupted.

---

This invention relates to automatic self-test devices and, more particularly, to automatic self-test devices for a monitor circuit which compares two condition signals and provides an error signal when the condition signals vary a predetermined amount relative to one another.

In automatic pilot or flight director systems, for example, it is important, for maximum safety, to provide means for self-testing the various circuits therein to insure that they are functioning properly. A flare coupler is operated only during the landing maneuver, and the integrity of its component circuitry will be unknown unless some device for in flight testing is provided.

For maximum effectiveness, these tests are initiated by the pilot at some time during the flight of the aircraft to indicate a malfunction. If the monitor develops a malfunction, the tests will indicate that the circuitry being tested is operating satisfactorily.

A device constructed according to the present invention provides for applying test signals to the monitor so as to unbalance normally balanced condition signals, thus simulating a system malfunction. Comparators sensing this unbalance provide error signals to activate a solenoid mechanism which indexes a rotary type switch so that the test signals are applied in a predetermined sequence. A successful test procedure is completed when the rotary switch has been indexed to its last position. If the comparator does not properly sense the signal unbalance, the indexing sequence of the rotary switch will be automatically interrupted, thus indicating a malfunction of the particular circuitry involved.

One object of this invention is to provide an automatic testing device for testing a monitor which normally compares balanced condition signals.

Another object of this invention is to provide an automatic testing device which operates on an error signal provided by varying two condition signals by a predetermined amount.

Another object of this invention is to provide means for testing a monitor by simulating a malfunction and noting the response thereto.

Another object of this invention is to provide an automatic device for testing a monitor providing balanced condition signals by unbalancing one of the condition signals to simulate a malfunction and noting the response of the monitor thereto.

The present invention contemplates a device for self-testing a monitor which detects malfunctions in electronic circuitry, such as that in a flight control system. The monitor has a comparator for comparing condition signals and provides an error signal when the condition signals vary a predetermined amount relative to one another. A test signal is combined with one of the condition signals to provide this variation, and the resulting error signal is used to indicate whether or not the circuit is operating satisfactorily. The test signals may be applied in a predetermined sequence to test various condition signals, and improper response to the test signals interrupts the test sequence to indicate a monitor malfunction.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In reference to the drawings wherein corresponding parts have been indicated by corresponding numerals;

FIGURE 2 is an isometric pictorial representation of means included in the present invention for providing test signals in a predetermined sequence.

Figure 1:
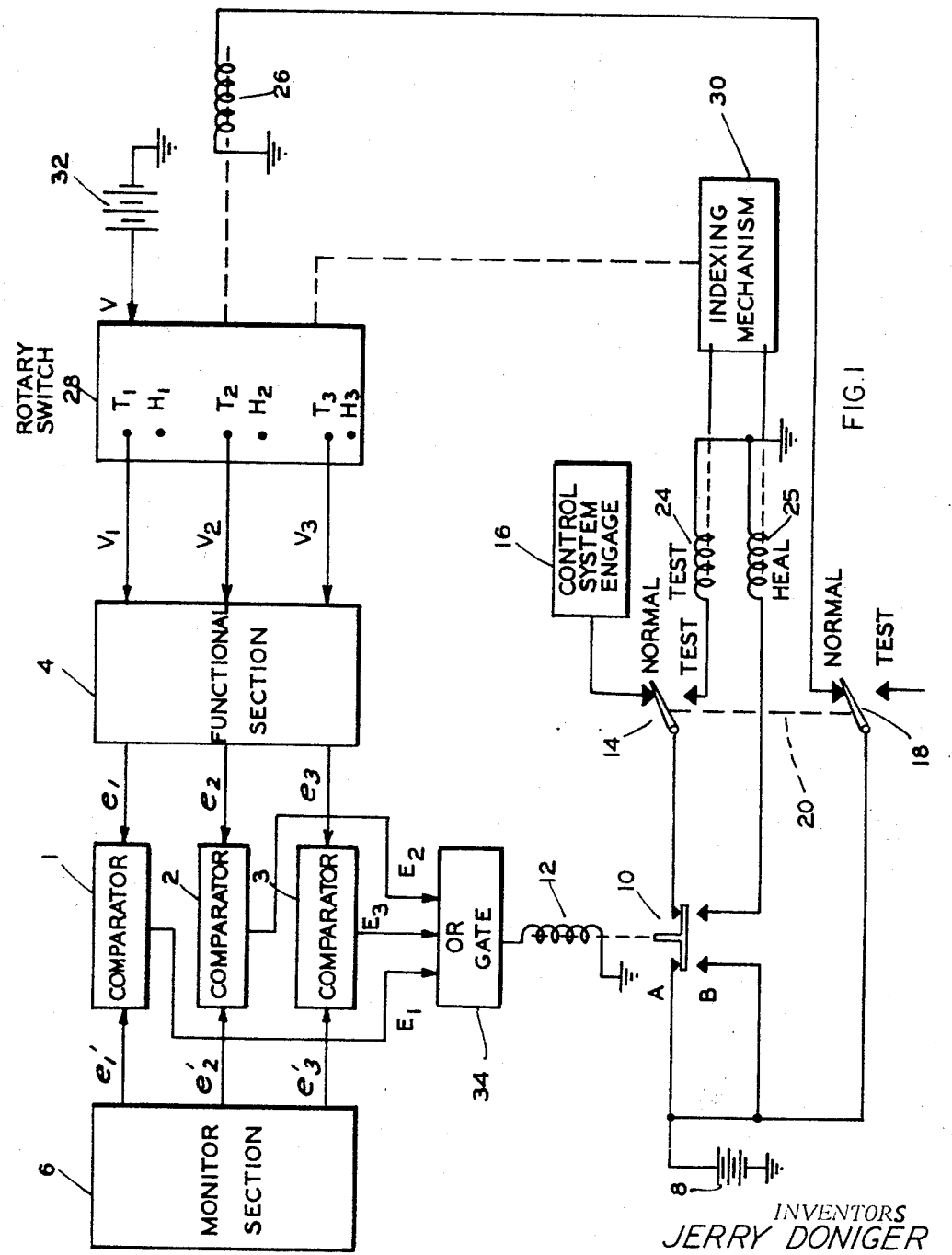
FIGURE 1 is a block diagram showing a monitor with an automatic testing device constructed according to the present invention.

A flight control system, such as an automatic pilot or flight director, may include a monitor having comparators, such as the comparators 1, 2 and 3 shown in FIGURE 1. These comparators receive signals $e_1$, $e_2$ and $e_3$ from a functional section 4 of the flight control system, and compare these signals to signals $e_1'$, $e_2'$ and $e_3'$ received from a monitor section 6. Under normal conditions, the signals received from functional section 4 are balanced by the signals received from monitor section 6, and no error output is provided by comparators 1, 2 and 3. This condition indicates that the flight control system is functioning properly. When a malfunction occurs, this balance is disturbed causing an error signal to be provided by the associated comparators 1, 2 or 3 which is applied to an OR GATE 34 and which actuates an alarm system indicating the malfunction to the pilot.

Comparators 1, 2 and 3 may be of the kind disclosed and claimed broadly in co-pending U.S. application Ser. No. 318,050, filed Oct. 22, 1963, and in co-pending U.S. application Ser. No. 351,426, filed Mar. 12, 1964, both filed by Frank John Thomas and Robert Leo Worthington, and assigned to The Bendix Corporation, assignee of the present invention.

The self-test device constructed according to the present invention simulates a malfunction by introducing a test signal, such as the signal $V_1$, $V_2$ or $V_3$, to deliberately unbalance the signals from functional section 4 and monitor section 6. These test signals are combined with signals $e_1$, $e_2$ and $e_3$ of functional section 4. The combined signals are not balanced by signals $e_1'$, $e_2'$ and $e_3'$ from monitor section 6, and error signals $E_1$, $E_2$ and $E_3$ appear at the output of comparators 1, 2 and 3, respectively, to be utilized to apply the test signals to the monitor in a predetermined sequence.

In further reference to FIGURE 1, under normal flight conditions, power is received from a direct current source 8 supplying power to the aircraft control system. A relay 10, normally in position A, is moved to position B by a solenoid 12, when the solenoid is energized by an error signal from comparator 1, 2 or 3.

Power from direct current source 8 is directed through relay 10 and a test switch 14 to a flight control system engage circuit 16, which provides for control of the aircraft by an automatic pilot or flight director system.

When it is desired that an in flight test sequence be performed, ganged switches 14 and 18 are moved by the pilot to test position. Test switch 14, in test position, disengages flight control system engage circuit 16, and energizes test solenoid 24. Test switch 18, in test position, de-energizes a re-set solenoid 26 having a purpose to be hereinafter described.

Test solenoid 24, and a heal solenoid 25, drive an indexing mechanism 30 which indexes a rotary type switch 28 to various positions, shown in FIGURES 1 and 2 as $T_1$, $H_1$, $T_2$, $H_2$, $T_3$ and $H_3$. Indexing mechanism 30 and rotary switch 28 are described with reference to FIGURE 2.

An input signal $v$ from a suitable power supply, such as a direct current source 32, is connected to rotary switch 28. When rotary switch 28 is indexed to position $T_1$, input signal $v$ is transmitted to functional section 4 as test signal $v_1$ and combined with the normal output of functional section 4 to provide signal $e_1$. Signal $e_1$ is compared, by comparator 1, to signal $e_1'$ received from monitor section 6. Since the signals are not of equal amplitude, error signal $E_1$ appears at the output of comparator 1, and a malfunction is thus simulated. Error signal $E_1$ is directed through an OR GATE 34, and operates solenoid 12 to move relay 10 to position B shown in FIGURE 1. Heal solenoid 25 is energized to actuate mechanism 30 which indexes rotary switch 28 to position $H_1$. At position $H_1$, no signal is transmitted to functional section 4, and signal $e_1$ at the output of functional section 4 balances signal $e_1'$ at the output of monitor section 6. At these balanced conditions, no error signal appears at the output of comparator 1, and relay 10 moves to position A shown in FIGURE 1. Test solenoid 24 is again energized causing rotary switch 28 to be indexed to position $T_2$.

When a successful test procedure has been completed, test switches 14 and 18 are manually moved by the pilot to their normal positions. Reset solenoid 26 is then energized through test switch 14 and returns rotary switch 28 to its pre-test position.

In reference to FIGURE 2, indexing mechanism 30 may consist of a ratchet wheel 38 and pawls 40 and 41. Ratchet wheel 38 is coupled to rotary switch 28 through shaft 42. Rotary switch 28 includes the axially spaced rings 44, 46 and 48, having circumferentially spaced conductive surfaces, such as surfaces $T_1$, $T_2$ and $T_3$, and nonconductive surfaces, such as surfaces $H_1$ and $H_2$. The contacts 50, 52 and 54 are suitably supported so as to make contact with rings 44, 46 and 48, respectively.

Test solenoid 24 and heal solenoid 25 actuate pawls 40 and 41, respectively, so as to advance ratchet wheel 38, and rotary switch 28 coupled thereto, in a particular direction. With switch 10 in position A, and test switch 14 in test position, as shown in FIGURE 1, test solenoid 24, coupled to pawl 40 by suitable mechanical means 56, actuates pawl 40 to advance ratchet wheel 38 one step so as to position conductive area $T_1$ of ring 44 under contact 50, causing signal $v_1$ to be applied to functional section 4 as shown in FIGURE 1. Similarly, when switch 10 is in position B, shown in FIGURE 1, heal solenoid 25 coupled to pawl 41 by suitable mechanical means 58, actuates pawl 41 to advance ratchet wheel 38 another step so as to position nonconductive area $H_1$ of ring 44 under contact 50. Since area $H_1$ is nonconductive, no signal is applied to functional section 4 shown in FIGURE 1, and no error signal appears at the output of comparator 1. Relay 10 is thus returned to position A as heretofore explained, to energize test solenoid 24 which advances ratchet wheel 38 another step so that conductive area $T_2$ on ring 46 of rotary switch 28 is positioned under contact 52. One test cycle is completed and another is commenced.

As indexing mechanism 30 indexes rotary switch 28, a spring 60 secured to shaft 42 is being wound up so as to store energy. When a successful test procedure has been completed and test switches 14 and 18 are manually returned to the normal position shown in FIGURE 1, re-set solenoid 26, connected to spring 60 through suitable mechanical means 62, releases spring 60 so that rotary switch 28 is returned to its normal position, and is in readiness to commence another test procedure.

*Operation*

An in flight test will be initiated by the pilot during the flight of the aircraft to check the integrity of selected circuitry. Particular emphasis, for example, may be placed on testing the circuits required for approach and landing. This will include tests of circuits in the roll and pitch control channels and flare coupler monitors. These tests may be performed in a predetermined sequence by using a device constructed according to the present invention as described herein.

To initiate such a test procedure, the pilot manually moves test switches 14 and 18 from normal position to test position, with switch 10 in position A, as shown in FIGURE 1. The desired tests are performed in a predetermined sequence as provided by rotary switch 28. Rotary switch 28 applies test signals $V_1$, $V_2$ and $V_3$ to functional section 4 of the flight control system to simulate a malfunction, and comparators 1, 2 or 3 respond thereto to provide error signals $E_1$, $E_2$ or $E_3$. An error signal so provided energizes relay 12 to move switch 10 to position B, causing rotary switch 28 to be indexed to a position where no test signal is applied. Under these conditions, no error signal will appear at the output of comparators 1, 2 or 3, and switch 10 will move to position A to cause rotary switch 28 to be indexed to a position where test signals are again applied.

If the monitor does not properly respond to the test signals, by providing error signals, the test sequence will be interrupted, since no signal is provided to move switch 10 from position A to position B. The test sequence will not continue until the pilot acknowledges the malfunction. A successful test is completed when rotary switch 28 is indexed to its last position by indexing mechanism 30, thus signifying removal of the last test signal in the absence of any faults in the system. The pilot may then disengage the testing device by manually moving test switches 14 and 18 from test normal positions.

For maximum safety and pilot acceptance, it is of the utmost importance that an easy, readily acceptable means be provided for testing the integrity of a flight control system. A device constructed according to the present invention satisfies these requirements and provides adequate assurance that the various components in a flight control system are functioning properly. These tests may be performed in flight at periodic intervals to provide an integrity check or, in the case of a flare computer, may be performed at some time prior to actual use, to provide a functional check. The feature provided by the present invention for interrupting a test sequence in case of a malfunction provides a fail safe indication of circuitry error. Such a device is an important addition to the automatic control of an aircraft, and should find wide use when automatic pilot or flight director systems are employed.

Although for purposes of illustration, only three test signals $V_1$, $V_2$ and $V_3$ are shown in FIGURE 1, it should be noted that the device is applicable to as many test signals as there are tests to be performed, with each successive test signal causing operation of the device in the manner described. Also, the test signals can be combined with signals $e_1'$, $e_2'$ and $e_3'$ from monitor section 4 to create the required unbalance.

Although but a single embodiment has been illustrated and described in detail, it is to be expressly understood that the invention is not limited thereto. Various changes may also be made in the design and arrangement of the parts without departure from the spirit and scope of the invention as the same will now be understood by those skilled in the art. For example, the described device may be used to test the circuitry of any system without regard to its ultimate use.

What is claimed is:

1. A monitor for a control system comprising:
   first means for providing a plurality of signals corresponding to a plurality of conditions related to the control system;
   second means for providing signals corresponding to a desired level of the condition signals;
   third means for providing a signal at a predetermined level;
   sequential switch means connected to the third means and to one of the first and second means for combining the signal from the third means with a selected signal from the one means so that said one means provides signals which do not correspond to the desired level of the signals from the other of the first and second means;
   comparator means connected to the first and second means for providing error signals when the signals from the first and second means do not correspond; and
   sequential switch control means connected to the comparator means and to the sequential switch means and responsive to the error signal for sequencing the sequential switch means so that the signal from the third means is combined with the selected signal from the one means in a predetermined sequence, with a system failure being indicated when the sequence is interrupted.

2. A monitor as described by claim 1, wherein:
   the sequential switch means is connected to the third means and to the first means for combining the signal from the third means with a selected signal from the first means so that the first means provides signals which do not correspond to the desired level of the condition signals.

3. A monitor as described by claim 1, wherein:
   the sequential switch means is connected to the third means and to the second means for combining the signal from the third means with a selected signal from the second means so that the second means provides signals which do not correspond to the desired level of the condition signals.

4. A monitor as described by claim 1, wherein:
   the sequential switch means is a rotary switch having conductive and non-conductive areas; and
   the sequential switch control means is responsive to the error signal for rotating the rotary switch whereupon the conductive and non-conducting areas are positioned to combine the signal from the third means with the selected signal from the one means in the predetermined sequence.

5. A monitor as described in claim 4, wherein the sequential switch control means comprises:
   a sequencing mechanism connected to the rotary switch;
   first and second solenoids connected to the sequencing mechanism;
   a power supply; and
   a switch connected to the comparator means and responsive to the error signals therefrom for sequentially connecting the power supply to the first and second solenoids for energizing said solenoids to actuate the sequencing mechanism and to rotate the switch.

6. A monitor as described by claim 5, wherein:
   the sequencing mechanism is actuated for rotating the switch and for positioning the conductive areas of the switch to combine the signal from the third means with the selected signal from the one means when the first solenoid is energized; and
   said sequencing mechanism is actuated for rotating the switch and for positioning the non-conductive areas of the switch to prevent combining of the signal from the third means with the selected signal from the one means when the second solenoid is energized.

7. A monitor as described by claim 6, wherein:
   the comparator means provides the error signals when the rotary switch is positioned for combining the signal from the third means with the selected signal from the one means.

8. A monitor as described by claim 1, wherein the comparator means connected to the first and second means for providing error signals when the signals from the first and second means do not correspond comprises:
   a plurality of comparators each of which compares selected signals from the first and second means and provides a difference signal when the compared signals do not correspond; and
   gating means connected to all of the comparators for providing the error signals when at least one of the comparators provides a difference signal.

References Cited

UNITED STATES PATENTS

| | | | |
|---|---|---|---|
| 2,696,604 | 12/1954 | Markow | 340—413 |
| 2,815,500 | 12/1957 | Hance | 340—413 |
| 3,082,412 | 3/1963 | Sargent | 340—413 |
| 3,178,695 | 4/1965 | Cadwell | 340—413 |
| 2,732,544 | 1/1956 | Bagno | 340—410 |
| 3,159,747 | 12/1964 | Jones | 340—410 |
| 3,189,883 | 6/1965 | Lucas | 340—410 |
| 3,202,976 | 8/1965 | Rowell | 340—410 |

THOMAS B. HABECKER, *Primary Examiner.*

U.S. Cl. X.R.

340—187